(12) United States Patent
Schmid et al.

(10) Patent No.: US 7,177,807 B1
(45) Date of Patent: Feb. 13, 2007

(54) MIDDLEWARE LAYER BETWEEN SPEECH RELATED APPLICATIONS AND ENGINES

(75) Inventors: Philipp H. Schmid, Seattle, WA (US); Ralph Lipe, Clyde Hill, WA (US); Robert Chambers, Issaquah, WA (US); Edward Connell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/006,236

(22) Filed: Dec. 6, 2004

Related U.S. Application Data

(62) Division of application No. 09/751,836, filed on Dec. 29, 2000.

(60) Provisional application No. 60/219,861, filed on Jul. 20, 2000, now abandoned.

(51) Int. Cl.
*G10L 15/00* (2006.01)
*G10L 13/00* (2006.01)

(52) U.S. Cl. .................. 704/231; 704/258; 704/270
(58) Field of Classification Search .................. None
See application file for complete search history.

(56) References Cited

U.S. PATENT DOCUMENTS

| | | | |
|---|---|---|---|
| 4,771,401 A | 9/1988 | Kaufman et al. | 364/900 |
| 4,914,590 A | 4/1990 | Loatman et al. | 364/419 |
| 5,621,859 A | 4/1997 | Schwartz et al. | 704/256 |
| 5,642,519 A | 6/1997 | Martin | 395/759 |
| 5,748,974 A | 5/1998 | Johnson | 704/9 |
| 5,799,273 A | 8/1998 | Mitchell et al. | 704/235 |
| 5,864,863 A | 1/1999 | Burrows | 707/103 |
| 5,865,626 A | 2/1999 | Beattie et al. | 434/185 |
| 5,991,720 A | 11/1999 | Galler et al. | 704/256 |
| 5,995,928 A | 11/1999 | Nguyen et al. | 704/251 |
| 6,021,409 A | 2/2000 | Burrows | 707/102 |
| 6,044,347 A | 3/2000 | Abella et al. | 704/272 |
| 6,064,959 A | 5/2000 | Young et al. | 704/251 |
| 6,076,056 A | 6/2000 | Huang et al. | 704/254 |
| 6,138,098 A | 10/2000 | Shieber et al. | 704/257 |
| 6,243,681 B1 * | 6/2001 | Guji et al. | 704/260 |
| 6,314,399 B1 | 11/2001 | Deligne et al. | 704/257 |
| 6,374,226 B1 | 4/2002 | Hunt et al. | 704/275 |
| 6,377,913 B1 | 4/2002 | Coffman et al. | 704/8 |
| 6,456,974 B1 | 9/2002 | Baker et al. | 704/270.1 |
| 6,466,909 B1 | 10/2002 | Didcock | 704/260 |
| 6,487,533 B2 | 11/2002 | Hyde-Thomson et al. | 704/260 |
| 6,513,009 B1 | 1/2003 | Comerford et al. | 704/270 |
| 6,526,381 B1 | 2/2003 | Wilson | 704/251 |
| 6,535,886 B1 | 3/2003 | Koontz | 707/102 |

(Continued)

OTHER PUBLICATIONS

Sun Microsystems "Java Speech API Programmer's Guide", Version 1.0, Oct. 26, 1998.*

(Continued)

*Primary Examiner*—David Hudspeth
*Assistant Examiner*—Matthew J Sked
(74) *Attorney, Agent, or Firm*—Westman, Champlin & Kelly, P.A.

(57) ABSTRACT

The present invention provides an application-independent and engine-independent middleware layer (204) between applications (202) and engines (206, 208). The middleware provides speech-related services to both applications (202) and engines (206, 208), thereby making it far easier for application vendors and engine vendors to bring their technology to consumers.

9 Claims, 14 Drawing Sheets

U.S. PATENT DOCUMENTS

| | | | |
|---|---|---|---|
| 6,618,703 B1 | 9/2003 | Peres et al. | 704/270 |
| 6,636,831 B1 | 10/2003 | Profit et al. | 704/275 |
| 2001/0047260 A1* | 11/2001 | Walker et al. | 704/260 |
| 2002/0138265 A1 | 9/2002 | Stevens et al. | 704/251 |

OTHER PUBLICATIONS

N. Hataoka et al. Sophisticated Speech Processing Middleware on Microprocessor, Central Research Laboratory, 1999, pp. 691-696.

Isolated-word sentence recognition using probabilistic context-free grammar By: G.J.F. Jones et al. Eurospeech 91, 2nd European Conf. On Speech Comm. and Tech. Proceedings p. 487-9, vol. 2.

Context-free grammar driven, frame synchronous HMM-based continuous speech recognition methods using word spotting By: S. Nakagawa et al. Transactions of the Inst. of Electr., Information and Communication Engineers D-II vol. J76D-II, No. 7, p. 1329-36.

One-pass continuous speech recognition directed by generalized LR parsing By: K. Kita et al., ICSLP 94. 1994 International Conference on Spoken Language Processing.

The ARISTOTLE speech recognition system By: C. Waters et al., Progress in Connectionist-Based Information Systems.

A context-free grammar compiler for speech understanding systems By: M.K. Brown et al. ICSLP 94. 1994 International Conference on Spoken Language Processing Part. vol. 1, p. 21-4.

Efficient word-graph parsing and search with a stochastic context-free grammar By: C.J. Waters et al., 1997 IEEE Workshop on Automatic Speech Recognition and Understanding Proceedings.

Dynamic programming parsing for context-free grammar in continuous speech recognition By: H. Ney, IEEE Transactions on Signal Processing, vol. 39, No. 2, p. 336-40.

Using a stochastic context-free grammar as a language model for speech recognition By: D. Jurafsky, et al., 1995 International Conference on Acoustics, Speech, and Signal Processing. Part 1, p. 189-92, vol. 1.

Development of an effective context-free parser for continuous stochastic languages By: L.R. Strydom et al., AFRICON 96'. Incorporating AP-MTT-96 and COMSIG-96.

Reliable utterance segment recognition by integrating a grammar with statistical language constraints By: H. Tsukada et al., Speech Communication vol. 26, No. 4, p. 299-309.

Active middleware services in a decision support system for managing highly available distributed resources By: S.A. Fakhouri et al., International Conf. On Distributed Systems Platforms and Open Distributed Processing. Lecture Notes in Computer Science vol. 1795, p. 349-71.

Improving scalability of event-driven distributed objects architectures. By: D. Mencnarowski et al., Poland Journal: Software-Practice and Experience vol. 30, No. 13, p. 1509-29.

Improved spelling recognition using a tree-based fast lexical match. By: C.D. Mitchell et al., 1999 IEEE International Conf. On Acoustics, Speech and Signal Proceedings. vol. 2, p. 597-600.

Event management components for the 3/sup rd/ generation OSS By: S, Desrochers et al., Proceedings of Network Operations and Management Symposium Conference Date: Apr. 10-14, 2000 Conference Location: Honolulu, HI, USA.

A context-dependent similarity measure for strings By: E. Tanaka. Transactions of the Institute of Electronics and Communication Engineers of Japan, Part A, VO. . J67A, No. 6, p. 612-13.

READY: a high performance event notification service By: Gruber, R.E. et al. Proceedings 16th International Conference on Data Engineering Conference Sponsor: IEEE Comput. Soc. Tech. Committee on Data Eng. Conference Date: Feb. 29-Mar. 3, 2000 Conference Location: San Diego, CA, USA.

An event notification framework based on Java and CORBA By: Tomono, M. Japan Conference Title: Integrated Network Management VI. Distributed Management for the Networked Millennium.

Mobile streams By: Ranganathan, M et al., Proceedings of the Sixth Annual Tcl/Tk Conference p. 203-4 Publisher: USENIX Assoc, Berkeley, CA, USA Publication Date: 1998.

A flexible and recoverable client/server database event notification system By: Hanson, E.N. et al., VLDB Journal vol. 7, No. 1 p. 12-24, 1998.

Using events to build distributed applications Author(s): Bacon, J. et al., Second International Workshop on Services in Distributed and Networked Environments Conference Sponsor: IEEE Comput. Soc. Tech. Committee on Distributed Process Conference Date: Jun. 5-6, 1995.

High-Performance Alphabet Recognition, IEEE Speech and Audio Processing, By: Philipos C. Loizue et al. Nov. 1996, vol. 4, No. 6, pp. 430-445.

Speaker-Independent Name Retrieval From Spellings Using a Database of 50,000 Names, By: Ronald A. Cole et al., 1991 International Conference on Acoustics, Speech, and Signal Processing vol. 5, pp. 325-328.

IBM Voicetype Software, By: R. Fletcher, IEE Colloquium on the Language Toolkit Engineers in Business.

Improving Recognizer Acceptance Through Robust, Natural Speech Repair By: Arthur E. McNair et al., 1994 International Conference on Spoken Language Processing. pp. S22-15.1-S22-15.4.

Temporal Decomposition and Acoustic-Phonetic Decoding for the Automatic Recognition of Continuous Speech By: P. Deleglise et al. 9th International Conference on Pattern Recognition. vol. 11, pp. 839-841.

Automated Directory Listing Retrieval System Based on Isolated Word Recognition By: Bernd Aldefeld et al., Proceedings of the IEEE, vol. 68, No. 11, Nov. 1980 pp. 1364-1379.

Empirical evaluation of interactive multimodal error correction. By: Suhm, B., 1997 IEEE Workshop on Automatic Speech Recognition and Understanding Proceedings.

Noise robust speech recognition makes in-car navigation safe and affordable By: Smolders, J. et al. 'Steps Forward'. Proceedings of the Second World Congress on Intellectual Transport Systems '95 Yokohama Part vol. 2 p. 601-4 vol. 2.

Building a listener engine: a Smalltalk interface to speech recognition By: LaLonde, W., Pugh, J. Journal: Journal of Object Oriented Programming (JOOP) vol. 10, No. 7 1997-1998.

LEAP: Language Enabled Application By: Alabiso, B. ; Kronfeld, A. First International Workshop on Human-Computer Conversation. Draft Proceedings p. 15.

Tools for developing voice-operated applications By: Newstadt, R.E., Speech Technology vol. 4, No. 4, p. 62-6.

Examining Microsoft's Speech SDK By: Davis, P., Dr. Dobb's Journal vol. 24, No. 7 p. 86, 88-90. 1999.

Recent improvements on Microsoft's trainable text-to-speech system-Whistler By: Haung, X et al., 1997 IEEE International Conference on Acoustics, Speech and Signal Processing (Cat. No. 97CB36052) Part vol. 2 p. 959-62 vol. 2.

Software text-to-speech By: Hallahan, W.J.; Vitale, A.J., Journal: International Journal of Speech Technology vol. 1, No. 2 p. 121-34.

Japanese text-to-speech software (FLUET) based on waveform synthesis method By: Hakoda, K.; Tsukada, H.; Hirokawa, T.; Yoshida, Y.; Mizuno, H.

Speech processing technology towards practical use By: Shirai, K.; Kobayashi, T.; Kudo, I.; Joho Shori vol. 38, No. 11 p. 971-5.

DECtalk Software: text-to-speech technology and implementation By: Hallahan, W.I., : Digital Technical Journal vol. 7, No. 4 p. 5-19.

The InfoPad user interface By: Burstein, A. et al., Digest of Papers. COMPCON '95. Technologies for the Information Superhighway.

* cited by examiner

MIDDLEWARE LAYER BETWEEN SPEECH RELATED APPLICATIONS AND ENGINES

CROSS-REFERENCE TO RELATED APPLICATIONS

The present application is a divisional of and claims priority of U.S. patent application Ser. No. 09/751,836, filed Dec. 29, 2000, and is related to co-pending application Ser. No. 11/012,547, filed Dec. 15, 2004, the contents of which are hereby incorporated by reference in their entireties.

BACKGROUND OF THE INVENTION

The present invention deals with services for enabling speech recognition and speech synthesis technology. In particular, the present invention relates to a middleware layer which resides between applications and engines (i.e., speech recognizers and speech synthesizers) and provides services, on an application-independent and engine-independent basis, for both applications and engines.

Speech synthesis engines typically include a decoder which receives textual information and converts it to audio information which can be synthesized into speech on an audio device. Speech recognition engines typically include a decoder which receives audio information in the form of a speech signal and identifies a sequence of words from the speech signal.

In the past, applications which invoked these engines communicated directly with the engines. Because the engines from each vendor interacted with applications directly, the behavior of that interaction was unpredictable and inconsistent. This made it virtually impossible to change synthesis or recognition engines without inducing errors in the application. It is believed that, because of these difficulties, speech recognition technology and speech synthesis technology have not quickly gained wide acceptance.

In an effort to make such technology more readily available, an interface between engines and applications was specified by a set of application programming interfaces (API's) referred to as the Microsoft Speech API version 4.0 (SAPI4). Though the set of API's in SAPI4 specified direct interaction between applications and engines, and although this was a significant step forward in making speech recognition and speech synthesis technology more widely available, some of these API's were cumbersome to use, required the application to be apartment threaded, and did not support all languages.

The process of making speech recognition and speech synthesis more widely available has encountered other obstacles as well. For example, many of the interactions between the application programs and the engines can be complex. Such complexities include cross-process data marshalling, event notification, parameter validation, default configuration, and many others. Conventional operating systems provide essentially no assistance to either application vendors, or speech engine vendors, beyond basic access to audio devices. Therefore, application vendors and engine vendors have been required to write a great deal of code to interface with one another.

SUMMARY OF THE INVENTION

The present invention provides an application-independent and engine-independent middleware layer between applications and engines. The middleware provides speech-related services to both applications and engines, thereby making it far easier for application vendors and engine vendors to bring their technology to consumers.

In one embodiment, the middleware layer provides a rich set of services between speech synthesis applications and synthesis engines. Such services include parsing of input data into text fragments, format negotiation and conversion to obtain optimized data formats, selecting default values and managing data output to an audio device.

In another embodiment, the middleware layer manages single-application, multivoice processes. The middleware layer, in another embodiment, also manages multi-application, multivoice mixing processes.

In yet another embodiment, the invention includes a middleware component between speech recognition applications and speech recognition engines. In such an embodiment, the middleware layer illustratively generates a set of COM objects which configures the speech recognition engine, handles event notification and enables grammar manipulation.

In yet another embodiment, the middleware layer between the speech recognition application and speech recognition engine marshals calls from multiple application process to the speech recognition engine, and directs recognition results to the appropriate application process.

Appendix A illustrates an exemplary set of APIs.

Appendix B illustrates an exemplary set of DDIs.

DETAILED DESCRIPTION OF ILLUSTRATIVE EMBODIMENTS

Figure 1:
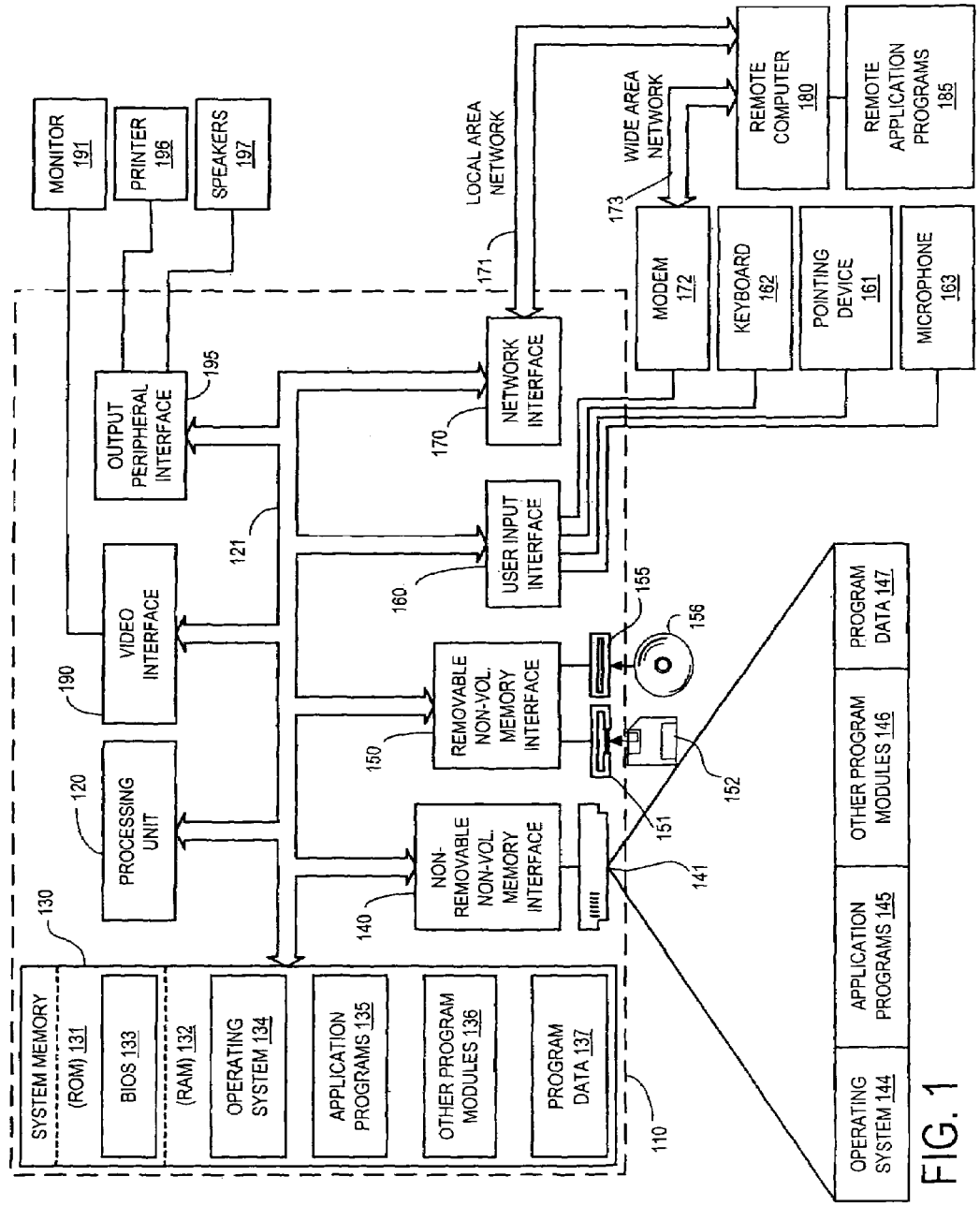
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
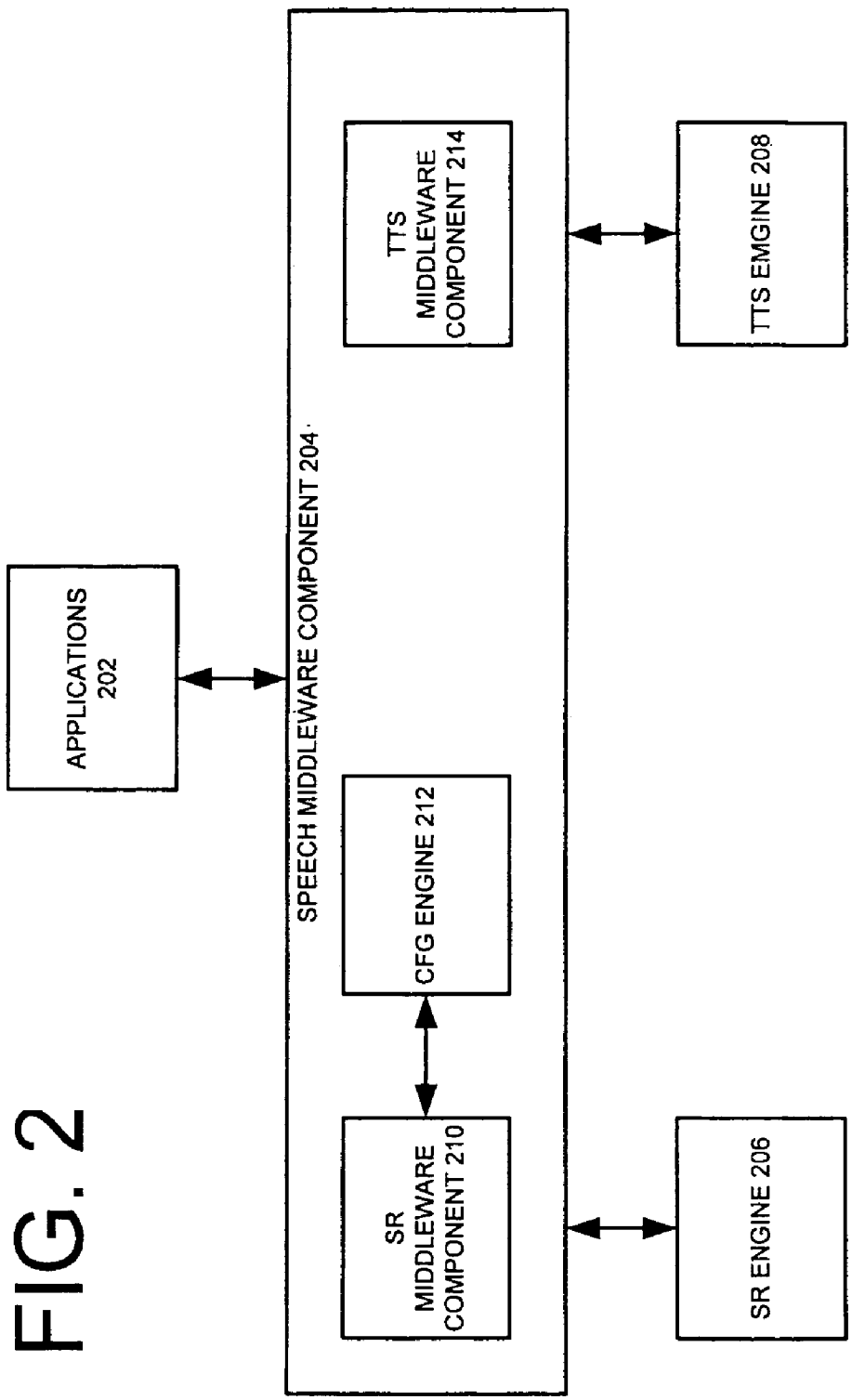
FIG. 2 is a block diagram of a speech recognition system in accordance with the present invention.

FIG. 2 is a more detailed block diagram of a speech recognition system 200 in accordance with one embodiment of the of the present invention. It should be noted that speech recognition system 200 can be incorporated into the environment illustrated in FIG. 1. Speech recognition system 200 includes one or more speech recognition applications 202, speech middleware component 204, one or more speech recognition engines 206 and one or more text-to-speech engines (synthesizers) 208.

In one illustrative embodiment, speech middleware component 204 is implemented in the operating system 134 illustrated in FIG. 1. Speech middleware component 204, as shown in FIG. 2, includes speech recognition middleware component 210, context free grammar (CFG) engine 212 and text-to-speech middleware component 214.

Briefly, in operation, speech middleware component 204 resides between applications 202 and engines 206 and 208. Applications 202 can be speech recognition and speech synthesis applications which desire to invoke engines 206 and 208. In doing so, applications 202 make calls to speech middleware component 204 which, in turn, makes calls to the appropriate engines 206 and 208 in order to have speech recognized or synthesized. For example, applications 202 may provide the source of audio data for speech recognition. Speech middleware component 204 passes that information to speech recognition engine 206 which simply recognizes the speech and returns a recognition result to speech recognition middleware component 210. Speech recognition middleware component 210 places the result in a desired format and returns it to the application 202 which requested it. Similarly, an application 202 can provide a source of textual data to be synthesized. TTS middleware component 214 assembles that data, and provides it to TTS engine 208, for synthesis. TTS engine 208 simply synthesizes the data and returns audio information to TTS middleware component 214, which handles spooling of that information to an audio device, writing that information to memory, or placing that information in any other desired location, as specified by the application 202 which requested it.

CFG engine 212, briefly, assembles and maintains grammars which are to be used by speech recognition engine 206. This allows multiple applications and multiple grammars to be used with a single speech recognition engine 206. This is discussed in greater detail later in the specification.

Figure 3:
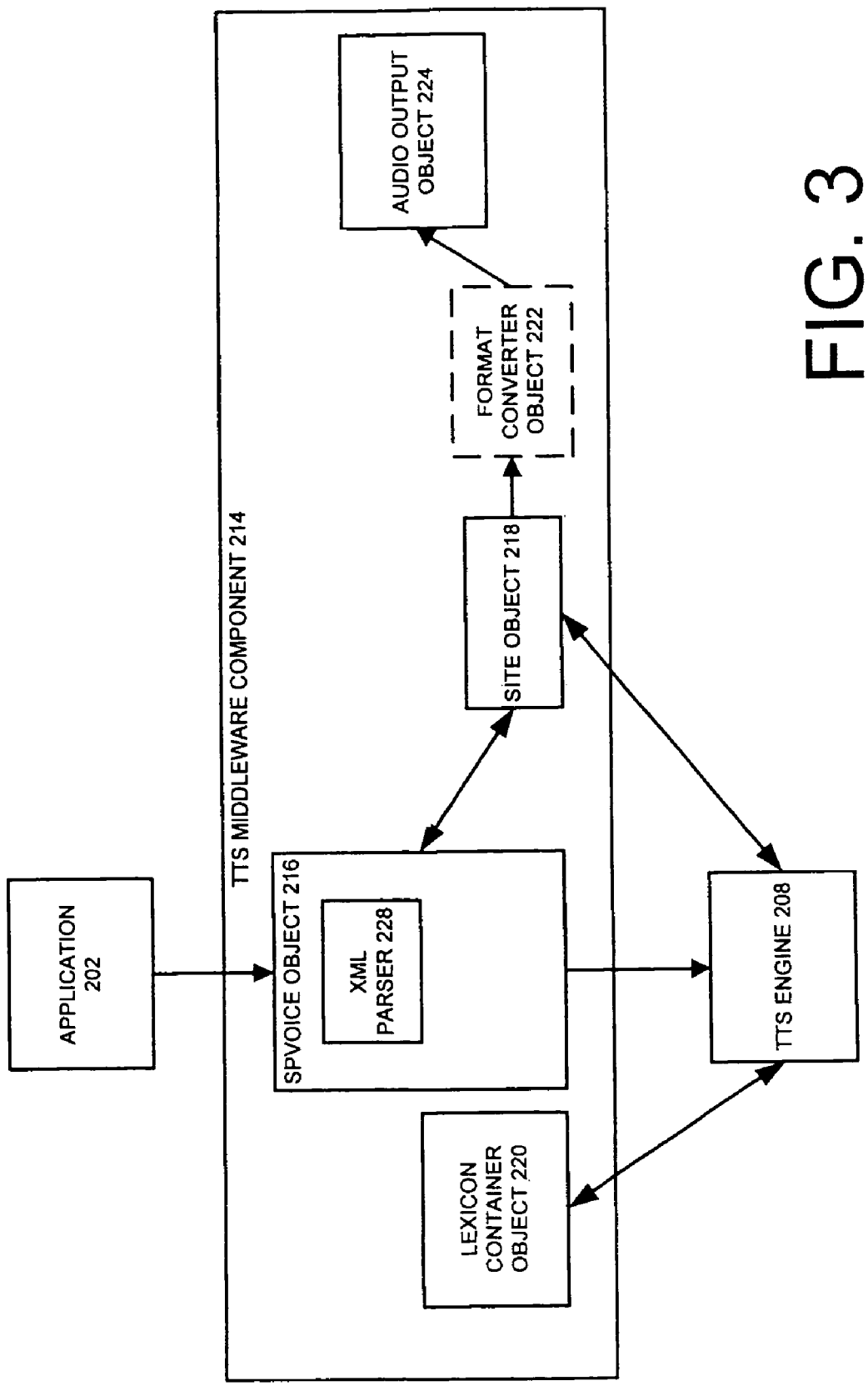
FIG. 3 is a more detailed block diagram of the TTS middleware component shown in FIG. 2.

FIG. 3 is a more detailed block diagram of a portion of system 200 shown in FIG. 2. Specifically, FIG. 3 illustrates TTS middleware component 214 in greater detail. TTS middleware component 214 illustratively includes a set of COM objects illustrated as the SpVoice object 216, Site object 218 and lexicon container object 220. In addition, TTS middleware component 214 can optionally include a format converter object 222 and an audio output object 224. In one illustrative embodiment, communication between the objects in TTS middleware component 214 and applications 202 is accomplished using application programming interfaces (API). Similarly, communication between the objects in TTS middleware component 214 and the TTS engine object 208 is accomplished using device driver interfaces (DDIs). One illustrative embodiment of DDIs and APIs and their related structures is set out in Appendices A and B hereto.

Figure 4:
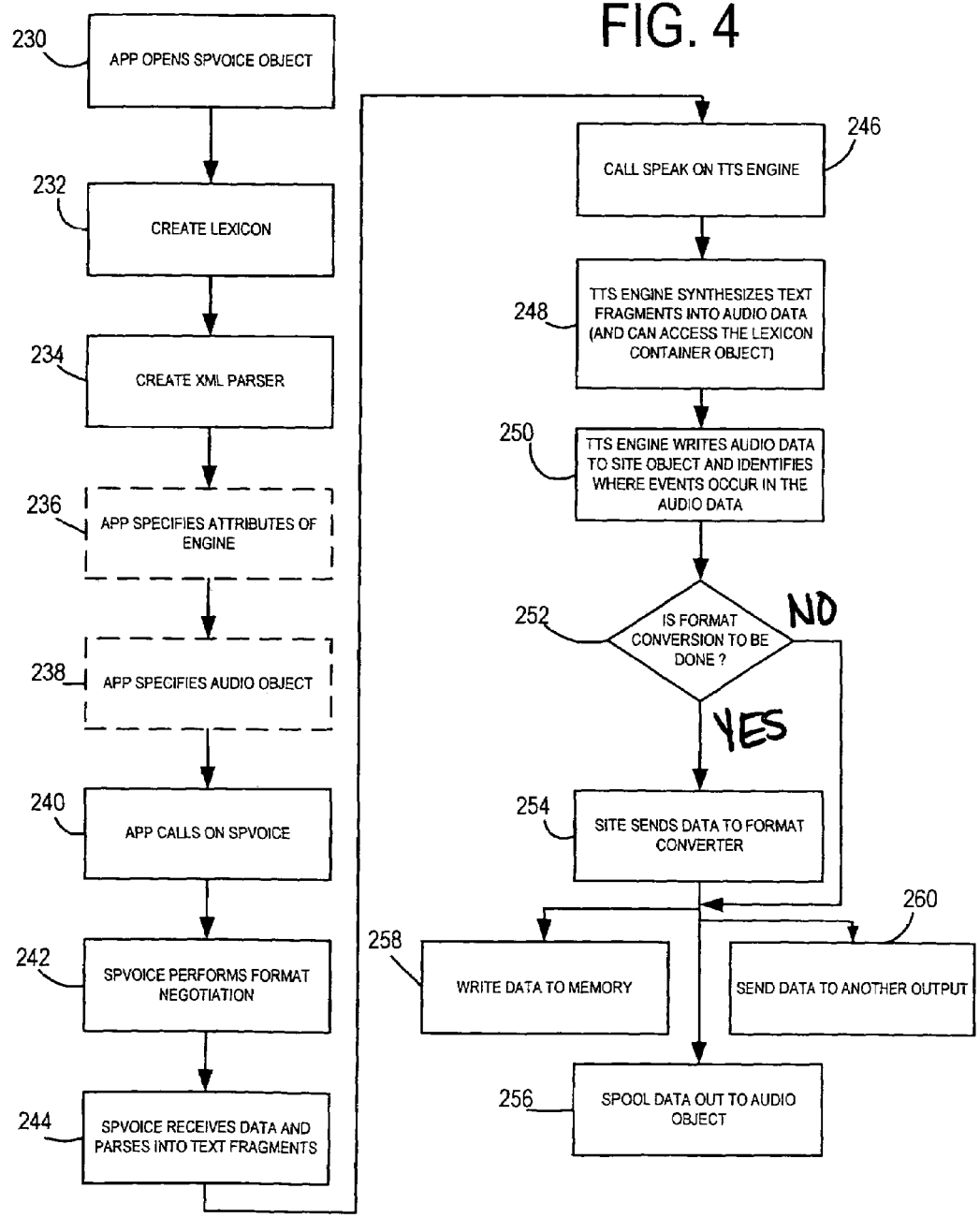
FIG. 4 is a flow diagram illustrating the general operation of the system shown in FIG. 3.

A general discussion of the operation of TTS middleware component 214, with applications 202 and engine 208, is illustrated by the flow diagram in FIG. 4. Initially, application 202 opens an instance of the SpVoice object 216. In one illustrative embodiment, the application calls the COM CoCreateInstance for the component CLSID_SpVoice to get a pointer to the interface ISpVoice of the SpVoice object. SpVoice object 216 then creates lexicon container object 220 and an XML parser object 228. This is indicated by blocks 230, 232 and 234 in FIG. 4.

Next, application 202 can either specify the attributes of TTS engine 208, such as whether the engine which is the synthesizer exhibits male or female voice qualities, the language of the synthesis, etc. This is done, for example, by calling the SetVoice method on the SpVoice object 216. This is indicated by optional block 236 in FIG. 4. In addition, the application can optionally specify the particular audio output object 224 which is desired. This is indicated by optional block 238 in FIG. 4.

The application 202 can set other attributes associated with the voice speaking, such as the rate and volume of speech, using for example, the SetRate and the SetVolume methods exposed by the SpVoice object 216. These are optional as well.

It should be noted that specifying the attributes of the engine 208 and audio output object 224 are optional. If the application does not specify these items, the first call to the SpVoice object 216 requiring synthesis results in the SpVoice object 216 choosing and initializing the default voice (i.e., the default TTS engine 208) and the default audio output object 224.

Once these items are configured properly, application 202 can call the SpVoice object 216 and request that textual information by synthesized. This can be done, for example, by calling the Speak or the SpeakStream methods on the SpVoice object 216. This is indicated by block 240.

The SpVoice object 216 then performs format negotiation. This is discussed in greater detail later in the specification with respect to FIG. 5. Briefly, however, the SpVoice object 216 attempts to optimize the format of data created by TTS engine 208 and that accepted by audio output object 224 for optimal synthesis. Format negotiation is indicated by block 242 in FIG. 4.

The SpVoice object 216 then breaks the textual information provided by application 202 into text fragments. For example, if the textual information is in XML, the SpVoice object 216 invokes the XML parser 228 to parse the XML input into text fragments. While the textual information can come from a variety of sources (such as a text buffer, straight textual information, XML, etc.) that information is broken into text fragments by SpVoice object 216, as indicated by block 244 in FIG. 4.

The SpVoice object 216 then calls a speak method on TTS engine 208, passing in the information to be synthesized. This is indicated by block 246. In doing this, the SpVoice object 216 also specifies a Site object 218 to be used by the TTS engine for returning the synthesized information.

TTS engine 208 receives the text fragments, synthesizes the text into WAV data (or other suitable audio data) and provides an indication of where events occur in the WAV data. For example, TTS engine 208 can illustratively provide an indication where word and phoneme boundaries occur in the WAV data. This information is all provided from TTS engine 208 to SpVoice object 216 through the Site object 218.

It should be noted that, in performing the synthesis, TTS engine 208 can access the lexicon object 220 contained in TTS middleware component 214. This is discussed in greater detail later in the specification with respect to FIGS. 9 and 10. Briefly, the lexicon container object 220 contains all lexicons of interest and the TTS engine 208 simply needs to access object 220 as if it were a single lexicon.

Synthesizing the actual fragments and writing them to the Site object are indicated by blocks 248 and 250 in FIG. 4.

During the format negotiation step 242, the SpVoice object 216 determines whether the format of the audio output object 224 or the format of the information provided by TTS engine 208 need to be converted. If conversion is required, information is provided to format converter object 222, such as through the ISpAudio or ISpStream interfaces, where the information is converted into a desired format for the audio output object 224. Format converter object 222 then manages the process of spooling out the audio information to audio output object 224 and also manages returning events noticed by the audio output object 224 to the Site object 218 and the SpVoice object 216 for transmission back to the application 202. This is indicated by blocks 252 and 254 in FIG. 4 Where no format conversion is desired, the information from the Site object 218 is spooled out to the audio output object 224 by the SpVoice object 216, through a suitable interface such as the IspStream interface. This is indicated by block 256.

Of course, it should also be noted that rather than providing the information directly to an audio output object 224, the information can be written to memory, as indicated by block 258, or provided at some other specified output or location as indicated by block 260 in FIG. 4.

Figure 5:
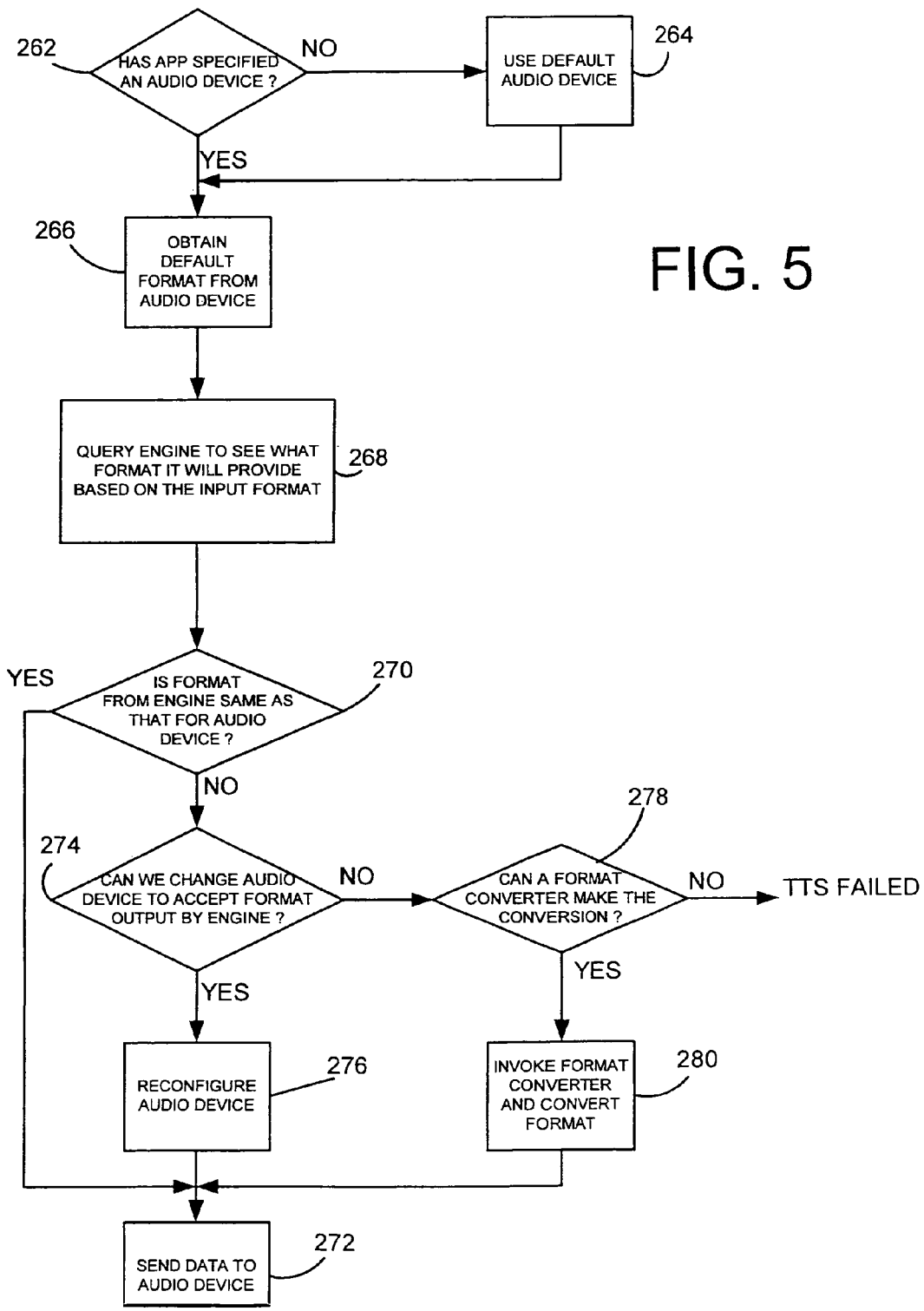
FIG. 5 is a flow diagram illustrating format negotiation and conversion.

FIG. 5 is a flow diagram illustrating the process of format negotiation and conversion (illustrated by blocks 242 and 254 in FIG. 4) in greater detail. In order to optimize the format used by TTS engine 208 and audio output object 224, SpVoice object 216 first determines whether the application has specified an audio output device object 224. If not, the default device object is initiated. This is indicated by blocks 262 and 264 in FIG. 5. If the application 202 specifies an audio output object 224, the application can also indicate whether it is acceptable to use a different format on that device, rather than the default format of the specified device.

In any case, once the appropriate audio output object 224 is initiated, SpVoice object 216 queries the audio output object 224 to obtain the default format from the audio output object 224. Obtaining the default format from the audio device object 224 is indicated by block 266 in FIG. 5.

Once the default format of information expected by the audio output object is obtained, the SpVoice object 216 queries TTS engine 208 to see what format it will provide based on the format that is input to it. This is indicated by block 268. It is next determined whether the output from TTS engine 208 is in the proper format to be received by the input to the audio output object 224. This is indicated by block 270. If the output format from TTS engine 208 matches the desired input format at audio output object 224, the information can be output in that format, to audio output object 224. This is indicated by block 272.

However, if, at block 270, it is determined that the output format from TTS engine 208 is not the same as the desired input format at audio output object 224, then the SpVoice object 216 determines whether it can reconfigure the audio output object 224 to accept the format output by TTS engine 208. This is indicated by block 274. Recall that, if the application specifies an audio output object 224 it can also specify that the input format not be changed.

If, at block 274, it is admissible to change the input format expected by the audio output object 224, then the audio output object 224 is simply reconfigured to accept the format output by TTS engine 208. This is indicated by block 276. The information can then be provided to the audio output object 224 as indicated by block 272.

However, if it is determined at block 274 that the expected input format of the audio output object 224 cannot be changed, the SpVoice object 216 determines whether a format converter 222 is available for converting the output format from the TTS engine 208 to the desired input format of audio output object 224. This is indicated by block 278. If no such converter is available, SpVoice object 216 simply provides an error message to application 202 indicating that the format conversion cannot be made. However, if a format converter is available to make the desired format conversion, the format converter is invoked so that the audio information from TTS engine 208 can be converted to the appropriate format. This is indicated by block 280. In that case, the converted audio information is provided from format converter object 222 to the audio output object 224, as indicated by block 272.

Figure 6:
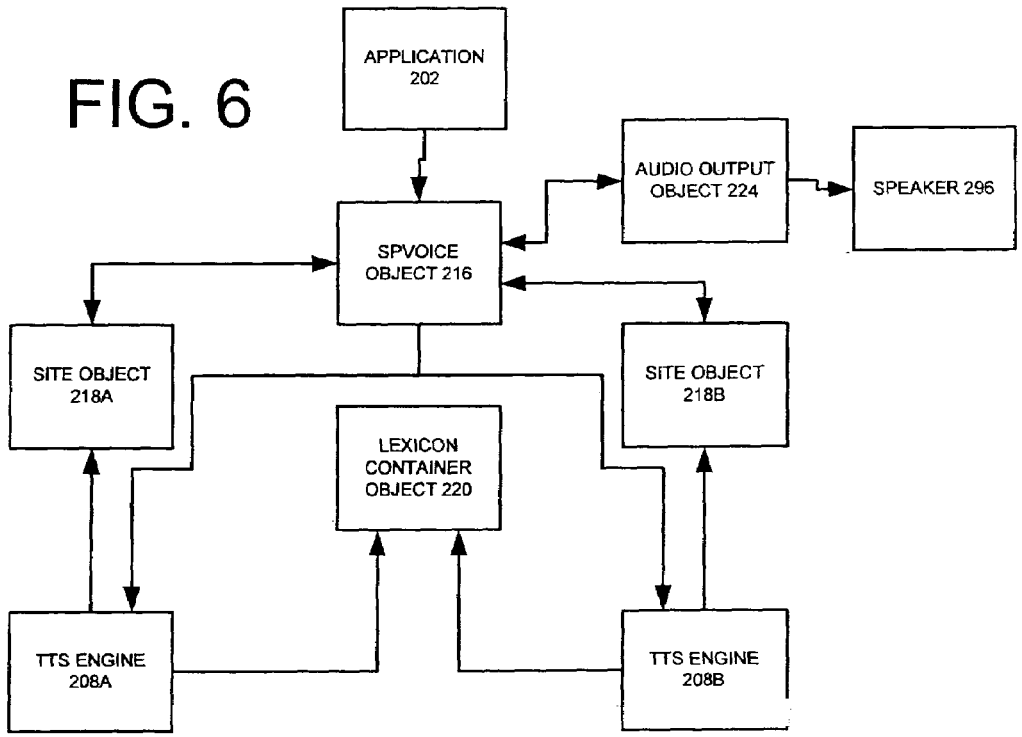
FIG. 6 is a more detailed block diagram of a multivoice implementation of the present invention.

FIG. 6 is a more detailed block diagram of another embodiment of TTS middleware component 214 illustrating another feature of the present invention. A number of the items shown in FIG. 6 are similar to those shown in FIG. 3 and are similarly numbered. However, there are some differences. FIG. 6 illustrates an embodiment in which an application may wish to invoke two different voices. In other words, in a game or other application, there may be a desire to implement text-to-speech for two different types of speakers (e.g., male and female, two different types of same-gender voices, two different languages, etc.).

Figure 7:
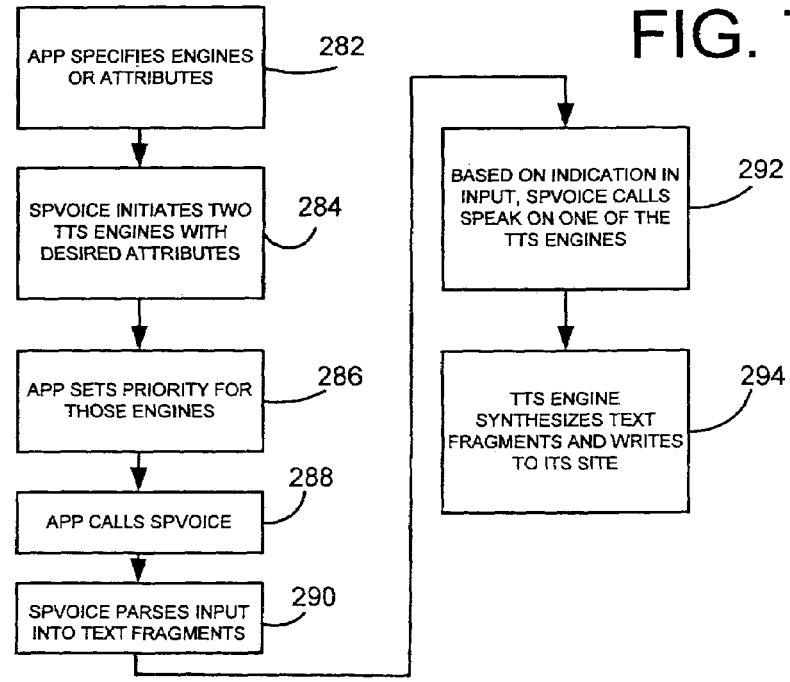
FIG. 7 is a flow diagram illustrating the operation of the system shown in FIG. 6.

In order accomplish this, the application first performs the same first several steps illustrated in the flow diagram of FIG. 4. For example, the application first opens SpVoice object 216, which in turn creates the lexicon and XML parsers. These steps are not shown in FIG. 7 for the sake of clarity. The application 202 then specifies the engines, or the attributes of the voices which the application desires. This is indicated by block 282.

Setting the attributes of the engine (or the voice) can be done, for instance, by calling the method SetVoice on SpVoice object 216. In response to these specified voices, SpVoice object 216 instantiates two different TTS engine objects 208A and 208B, which contain the desired attributes specified by the application. Therefore, for example, if the application 202 specifies one male voice and one female voice, SpVoice object 216 instantiates a TTS engine 208A which has attributes of a female voice and TTS engine 208B which has attributes of a male voice. This is indicated by block 284. Application 202 also sets the priority for those specified voices (or engines). This is indicated by block 286. The priority basically indicates which TTS engine takes precedence in speaking, and is described in greater detail below. Setting the priority can be called, for instance, by invoking the method SetPriority on the SpVoice object 216.

Once the engines have been instantiated and the priorities set, the application indicates to the SpVoice object 216 that is wishes some textual information to be spoken. This is indicated by block 288 and can be done, for example, by calling Speak or SpeakStream on the SpVoice object 216. The information provided will also identify the particular engine 208A or 208B which application 202 wishes to have speak the information.

The textual input information is then parsed into text fragments as indicated by block 290. For example, if the input is an XML input, the XML is parsed into text fragments.

Based on the indication from application 202 (such as an XML tag on the input information) SpVoice object 216 calls the appropriate TTS engine 208A or 208B requesting synthesis and passing in the information to be synthesized. This is indicated by block 292. The TTS engine 208A or 208B which has been called, synthesizes the text fragments and writes the audio information to its corresponding Site object 218A or 218B. This is indicated by block 294. The synthesized information is then provided from Site 218A or 218B to audio output object 224 which provides it in turn to an audio device, such as speaker 296 or to another set of API's or objects, as desired.

It should be noted that, in setting priority as shown in block 286, a number of different things can be accomplished. If the priorities are set to normal, then the requests by application 202 to speak text are simply queued and are spoken in the order received. However, other priorities can be set as well. If a priority is set to alert, an audio message can be injected, in the middle of another audio message which is playing. Similarly, if the priority is set to speakover, then that audio text will simply speak at the same time as the audio which is currently being spoken.

Figure 8:
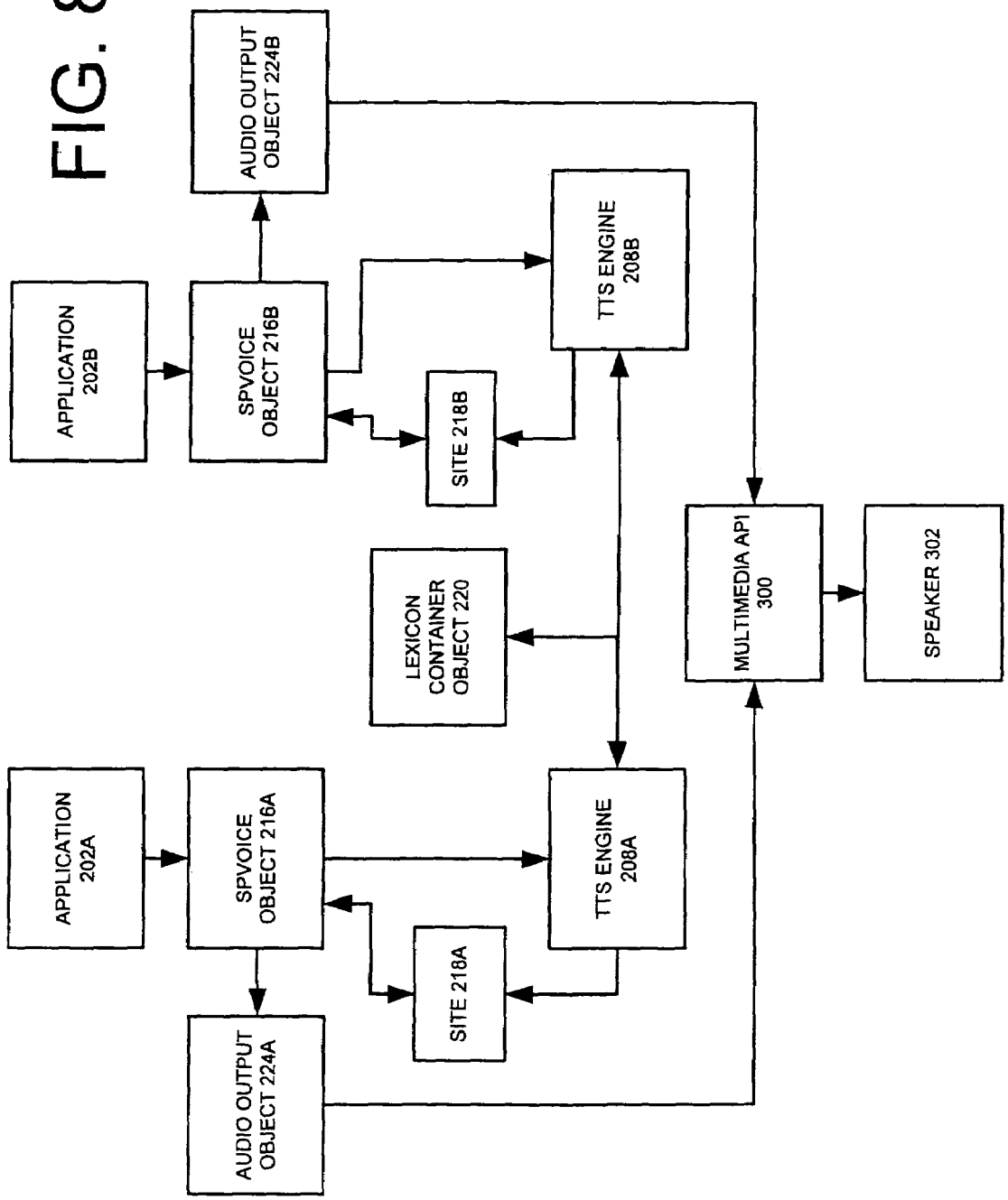
FIG. 8 is a more detailed block diagram of a multiapplication, multivoice implementation of the present invention.

The priorities are better illustrated with respect to FIG. 8. FIG. 8 shows a multiprocess, multivoice implementation of the present invention. In FIG. 8, two applications 202A and 202B have created two separate instances of the SpVoice object 216A and 216B. Those objects have created separate grammar container objects 220A and 220B as well as separate Site objects 218A and 218B, TTS engine objects 208A and 208B and audio objects 224A and 224B. The outputs from the audio output objects 224A and 224B are provided to a multimedia application programming interface (API) 300, such as that supported by the WINDOWS98 operating system, Second Edition or by the WINDOWS2000 operating system. The output of the multimedia API 300 is provided to an audio device, such as speaker 302.

The operation of processes A and B shown in FIG. 8 is similar to that illustrated by FIGS. 3–5 discussed above. It should also be mentioned, however, that in addition to setting the priority for a given voice, or TTS engine, the application can also specify the insertion points in a synthesized stream for alerts. Therefore, in one example, assume that application 202A has specified its request to speak as having a normal priority, and application 202B has specified its request to speak as having an alert priority, and further assume that audio output object 224A is speaking data which is being spooled out by either SpVoice object 216A or Site object 218A. Now assume that TTS engine 208B returns synthesis information which has been prioritized with an alert priority. Audio output object 224A will be allowed to speak to the alert boundary set by application 202A (such as the end of the current word) at which point the audio output object 224A will be closed and control will be assumed by SpVoice object 216B and audio output object 224B such that only its information can be output to multimedia API 300 and subsequently to speaker 302. This can be accomplished using a shared mutex scheme such as that provided through WinAP services. When audio output object 224A is closed, the SpVoice object 216A simply does not return on the call which TTS engine 208A has made to Site 218A. Therefore, TTS engine 208A simply pauses. After the alert message has been spoken, SpVoice object 216B and audio output object 224B release the mutex such that SpVoice object 216A and audio output object 224A can continue speaking. At that point, SpVoice object 216A returns on the TTS engine call such that TTS engine 208A can continue its processing.

If the two speak commands by applications 202A and 202B are indicated as speakover priority, then assuming that the multimedia API layer 300 supports mixing, the audio information from both audio output object 224A and audio object 224B will be spoken by speaker 302, at the same time. If the speak requests are indicated as normal, then the speak requests are queued and are spoken, in turn.

It should also be noted that if, within either process A or process B multiple speak requests are received, then processing is handled in a similar fashion. If a normal speak request is followed immediately by an alert request, than the normal speak request is halted at an alert boundary and the alert message is spoken, after which the normal speak request is again resumed. If more then one alert message is received within a single process, the alert messages are themselves queued, and spoken in turn.

It should also be noted that the configuration illustrated in FIG. 8 can be implemented by one application 202, rather than two applications. In that case, a single application 202 simply co-creates two instances of the SpVoice object 216. Those instances create the remaining objects, as illustrated in FIG. 8.

Figure 9:
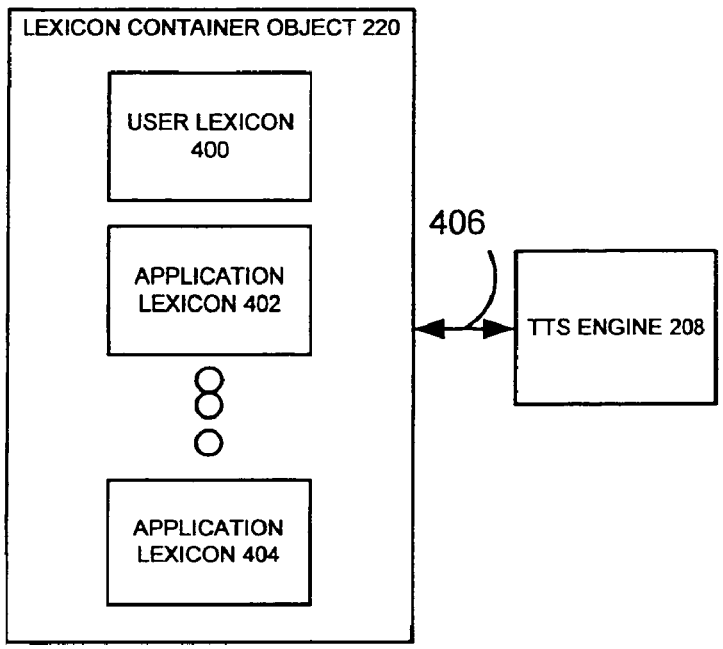
FIG. 9 illustrates a lexicon container object.

FIG. 9 is a more detailed block diagram illustrating the lexicon container object 220 shown and discussed in the above Figures. Lexicon container object 220 illustratively contains a plurality of lexicons, such as user lexicon 400 and one or more application lexicons 402 and 404. In accordance with one aspect of the present invention, certain applications can specify lexicons for use by the TTS engine 208. For example, such lexicons may contain words that have pronunciations which are not obtainable using normal letter-sound rules. In addition, a user may have a specified lexicon containing words which the user commonly uses, and which are not easily pronounceable and for which the user has a desired pronunciation. Such user lexicons can be changed through the control panel.

In any case, once the lexicon container object 220 is created, it examines the registry for user and application lexicons. Lexicon container object 220 can also expose an interface 406 accessible by TTS engine 208. This allows the TTS engine 208 to not only access various lexicons 400, 402 and 404 stored in lexicon container object 220, but also allows TTS engine 208 to add a lexicon to lexicon container object 220 as well. Lexicon container object 220 represents all of the lexicons contained therein, as one large lexicon to TTS engine 208. Therefore, TTS engine 208 or application 202 need not handle providing access to multiple lexicons, as that is all handled by lexicon container object 220 through its exposed interface.

Figure 10:
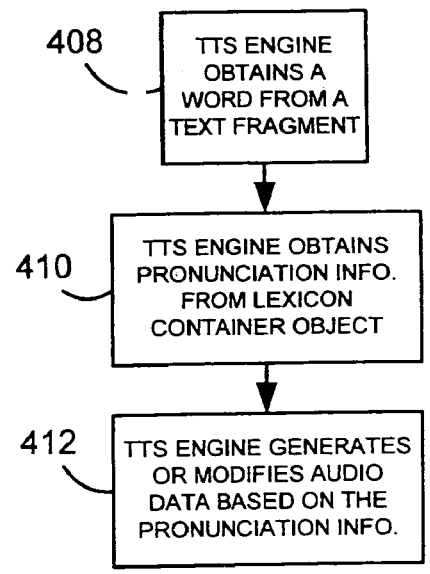
FIG. 10 is a flow diagram illustrating operation of the lexicon container object shown in FIG. 9.

FIG. 10 is a flow diagram illustrating operation of lexicon container 220 and TTS engine 208. In operation, once TTS engine 208 has obtained a synthesized word as indicated by block 408 in FIG. 10, it accesses lexicon container object interface 406 to determine whether a user or application has specified a pronunciation for that word, as indicated by block 410. If so, it changes the audio data created by it to reflect the pronunciation contained in lexicon container object 220 and provides that information to its Site 218. This is indicated by block 412.

This provides significant advantages. For example, in the past, TTS engines 208 contained the lexicon. If a user had terms with user-specified pronunciations, every time an application opened up a separate TTS engine that engine would speak the user's pronunciations improperly, until the TTS engine lexicon was modified. In contrast, using lexicon container object 220, each time a different TTS engine 208 is opened, it will automatically be directed to the user lexicon 400 such that the user's preferred pronunciations will always be used, regardless of the TTS engine 208 which is opened. This engine-independent lexicon thus greatly improves the process.

Figure 11:
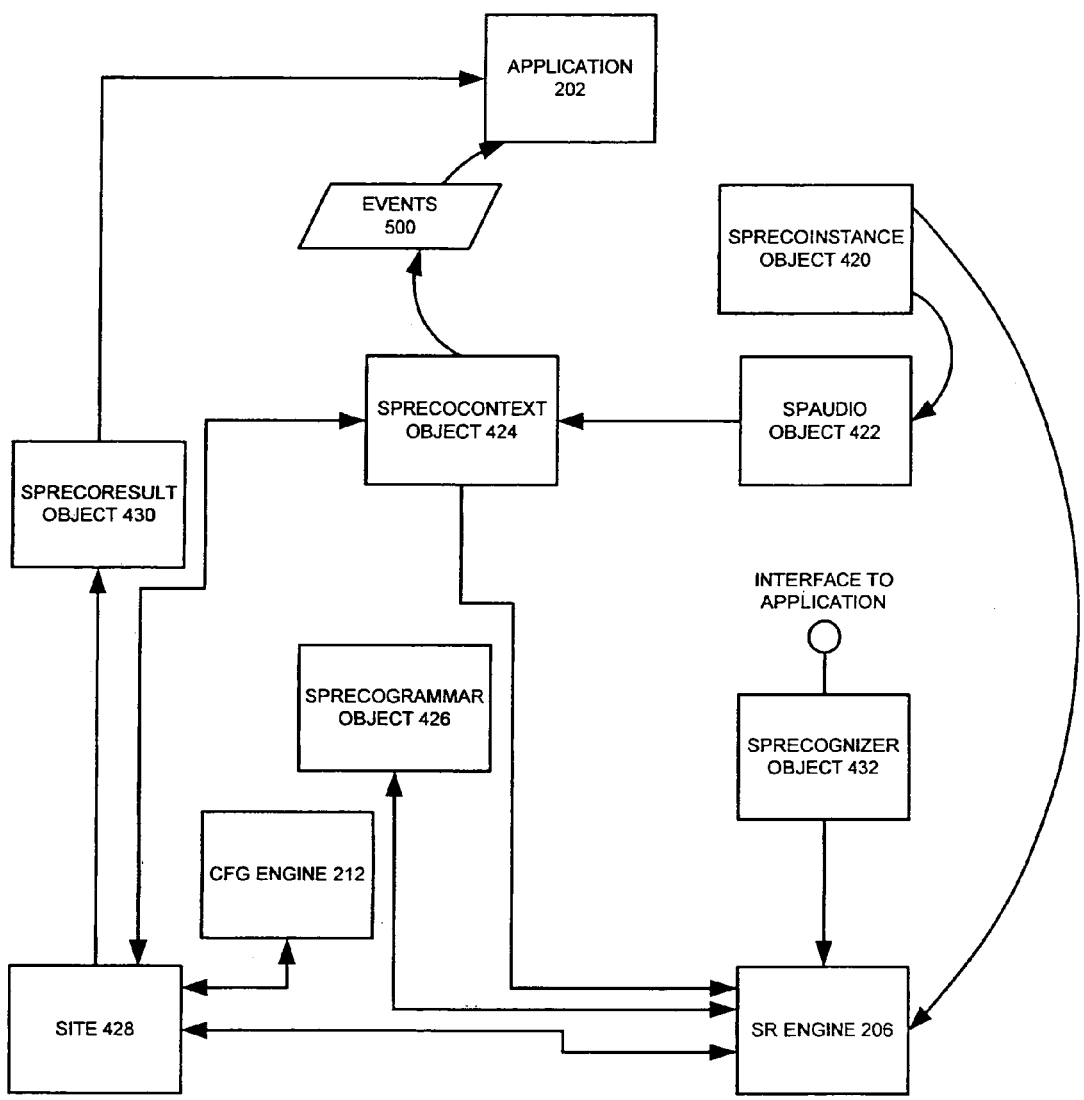
FIG. 11 is a more detailed block diagram of SR middleware component 210 shown in FIG. 2.

FIG. 11 is a more detailed block diagram of a portion of system 200 as shown in FIG. 2. More specifically, FIG. 11 illustrates SR middleware component 210 in greater detail. In the embodiment illustrated in FIG. 11, SR middleware component 210 includes a SpRecoInstance object 420 which represents an audio object (SpAudio 422, which provides an input audio stream, and its processor) and a speech recognition (SR) engine 206. SR middleware component 210 also includes SpRecoContext object 424, SpRecoGrammar object 426, SpSite object 428 SpRecoResult object 430 and SpRecognizer object 432. The SpRecoContext object 424 is similar to the SpVoice object 216 in TTS middleware component 214 in that it generally manages data flow, and performs services, within SR middleware component 210. SpRecoContext object 424 exposes an interface which can be used to communicate with application 202. SpRecoContext object 424 also calls interface methods exposed by SR engine object 206.

The SpRecoGrammar object 426 represents the grammar which the SR engine 206 associated with the SpRecoGrammar object 426 will be listening to. The SpRecoGrammar object 426 can contain a number of different items, such as a dictation topic grammar, a context free grammar (CFG), a proprietary grammar loaded either by SR engine 206 or application 202 and a word sequence data buffer which is explained in greater detail later in the specification.

Figure 12:
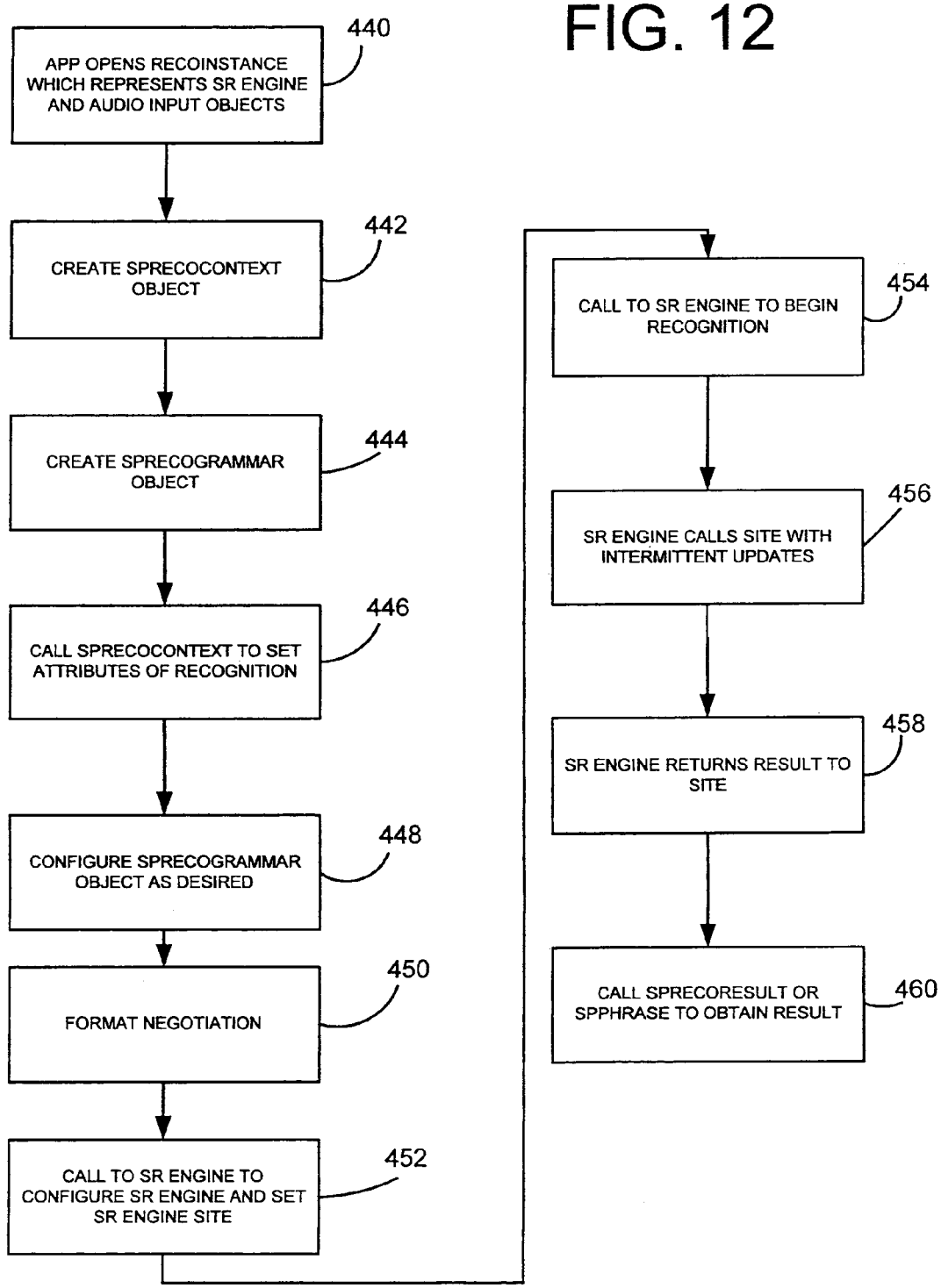
FIG. 12 is a flow diagram illustrating the general operation of the system shown in FIG. 11.

FIG. 12 is a flow diagram which illustrates the general operation of the embodiment of the SR middleware component 210 as illustrated in FIG. 11. First, application 202 opens the SpRecoInstance object 420 which creates an instance of SR engine 206 and the audio input object 422. Again, as with text-to-speech implementations, the application can request a specific SR engine 206 and audio engine 422. If one is not specified, the default objects are automatically initiated. This is indicated by block 440 in FIG. 12.

The SpRecoContext object 424 is then created as illustrated by block 442 in FIG. 12. The application can then call exposed interfaces on SpRecoContext object 424 to create the SpRecoGrammar object 426. Such an interface can include, for instance, the CreateGrammar method. Creation of the SpRecoGrammar object is illustrated by block 444 in FIG. 12.

The application then calls the SpRecoContext object 424 to set desired attributes of recognition, as indicated by block 446. For example, the application can determine whether it would like alternatives generated by SR engine 206 by calling the SetMaxAlternative method and can also enable or disable the retention of the audio information along with the results. In other words, SR middleware component 210 will retain the audio information which is provided by audio object 422 upon which SR engine 206 performs recognition. That way, the audio information can be reviewed later by the user, if desired. The application can also call interfaces exposed by the SpRecoContext object 424 in order to change the format of the retained audio. Otherwise, the default format which was used by the recognition engine 206 in performing recognition is used.

The application then illustratively configures the SpRecoGrammar object 426 as desired. For example, the application 202 can load a grammar into the SpRecoGrammar object by calling the LoadDictation method. The application can also set a word sequence data buffer in engine 206 by calling the SetWordSequenceData method. Further, the application can activate or deactivate grammar rules by either rule ID or by rule name, by calling the SetRuleIDState method or the SetRuleState method, respectively. The application can also enable or disable grammars within the SpRecoGrammar object 426 by calling the SetGrammarState method. It should be noted that, when a grammar is disabled, the SpRecoGrammar object 426 stores the state of the grammar prior to it being disabled. Therefore, when it is again enabled, the SpRecoGrammar object can automatically activate and deactivate rules in that grammar to obtain its previous activation state. Further, the application can load command and control grammars by calling the LoadCmdFromXXXX where "XXXX" can be a file, object, resource or memory. Configuring the SpRecoGrammar object is indicated by block 448 in FIG. 12.

The SpRecoContext object 424 then performs a format negotiation as indicated with the speech synthesis embodiment. In other words, the SpRecoContext object 424 queries the audio input object 422 to determine the format of the audio input. The SpRecoContext object 424 also quires SR engine 206 to determine what format it desires, and will reconfigure the audio object 422 or the SR engine 206 as desired, if possible. The format negotiation is indicated by block 450 in FIG. 12.

SpRecoContext object 424 then calls device driver interfaces exposed by SR Engine 206 to configure the engine and to set SrEngineSite 428, as indicated by block 452. The Site for the engine to use is set by calling the SetSite method on SR engine 206. This provides the handle to Site object 428 which is the object that SR engine 206 calls to communicate events and recognitions as well as to synchronize with and make other communications with, SR middleware component 210.

Acoustic recognition information is also set in engine 206 by, for instance, calling the SetRecoProfile method exposed by engine 206. The acoustic profile information may vary, for example, with user, or with application. Therefore, the appropriate acoustic profile information is obtained from the registry and loaded into SR engine 206.

The engine can also be loaded with specific or proprietary grammars or language models by calling the LoadProprietaryGrammar method or the LoadSLM method, respectively. The SpRecoContext object 242 can also set up a text buffer structure and hand SR engine 206 a pointer to it by calling the OnCreateGrammar method and can also set a word sequence data buffer in engine 206 by calling the SetWordSequenceData method.

The word sequence data buffer is a buffer which can be populated, on-the-fly, by the application. In one illustrative embodiment the word sequence data buffer contains double null terminated entries which can be used by SR engine 206 in making a recognition. For example, a CFG rule, which spawns a recognition by SR engine 206, can point SR engine 206 into the word sequence data buffer to look for matches of subsequent word sequences. In one illustrative embodiment, such a rule may spawn a recognition of the words "Send e-mail to". In that case, the application can populate the word sequence data buffer with electronic mail aliases. SR engine 206 then searches the word sequence data buffer to better refine the recognition process in making a recognition of the following speech.

Once SR engine 206 is configured, the SpRecoContext object 424 can call SR engine 206 to begin recognition. Such a call can be made on, for example, the RecognizeStream method. When such a method is called, SR engine 206 begins recognition on an input data stream and the process continues until a buffer containing the data to be recognized is empty, or until the process is affirmatively stopped. Beginning recognition is illustrated by block 454 in FIG. 12.

During recognition, SR engine 206 illustratively calls Site object 428 with intermittent updates. This is indicated by block 456. The Site object 428 exposes interfaces which are called by SR engine 206 to return these intermittent updates, to get audio data for recognition, and to return sound events and recognition information. For example, SR engine 206 calls the Site object to indicate when a sound has begun, and when it has ended. The SR engine 206 also calls Site to provide the current position of recognition in the input stream, such as by calling the UpdateRecoPos method. SR engine 206 can also call the Synchronize method to process changes in the state of its active grammar. In other words, the application may have changed the state of the active grammar in the SpRecoGrammar object being used by SR engine 206 during recognition. Therefore, SR engine 206 periodically calls Synchronize to stop processing and update the state of its active grammar. This can be done by obtaining word, rule, and state transition information for CFG rules, words and transitions in the SpRecoGrammar object 426. It does this, for example, by calling the GetRuleInfo, GetWordInfo, and GetStateInfo methods on the Site object.

SR engine 206 also illustratively calls Site 428 when either a recognition hypothesis or an actual final recognition has been obtained, by calling the Recognition method and either setting or resetting a hypothesis flag contained in the input parameters for the method. Once the final result is obtained, it is returned to Site 428 by calling the Recognition method and indicating that data is available, and by having the hypothesis flag reset. This is indicated by block 458 in FIG. 12. Of course, it should also be noted that where alternatives are requested, SR engine 206 passes those alternatives back to Site 428 along with the result.

Once Site contains the information indicating a final recognition, CFG engine 212 creates a complex result from the recognition information. The application 202 can then obtain the recognition result by calling the SpRecoResult object 430 or an associated SpPhrase object (not shown). For example, on the SpPhrase object, the application can call the GetPhrase or GetText methods which retrieve data elements associated with the phrase. The application can also obtain elements associated with alternatives and replace the original phrase with the alternatives by calling the GetAltInfo method and the Commit method, respectively.

One illustrative data structure which identifies a recognized result is as follows:

SPPHRASE

Typedef [restricted] struct SPPHRASE

| | |
|---|---|
| ULONG | cbSize; |
| LANGID | LangID; |
| WORD | wReserved; |
| ULONGLONG | ftStartTime; |
| ULONGLONG | ullAudioStreamPosition; |
| ULONG | ulAudioSizeBytes; |
| ULONG | ulAudioSizeTime; |
| SPPHRASERULE | Rule; |
| const SPPHRASEPROPERTY | *pProperties; |
| const SPHRASEELMENT | *pElements; |
| ULONG | cReplacements; |
| const SPPHRASEREPLACEMENT | pReplacements; |
| GUID | SREngineID; |
| ULONG | ulSREnginePrivateDataSize; |
| const BYE | *pSREnginePrivateData; |
| SPPHRASE | |

MEMBERS
- cbSize—The size of this structure in bytes.
- LangID—The language ID of the current language.
- WReserved—Reserved for future use.
- FtStart Time—The start time of the recognition in the input stream.
- UllAudioStreamPosition—The start position of the recognition in the input stream.
- UlAudioSizeBytes—The size of audio information.
- UlAudioSizeTime—The time of audio information.
- Rule—The rule that spawned this result.
- pProperties—The pointer to the semantic properties for the rule that spawned this result.
- pElements—The pointer to the elements of the result.
- pReplacements—The pointer to the replacement elements.
- SREngineID—The ID of the SR engine which produced the results.
- UlSREnginePrivateDataSize—The size of any proprietary data sent by the SR engine.
- PSREnginePrivateData—The pointer to the proprietary data.

Application 202 can also set book marks in the audio stream to be recognized. For example, the application 202 may desire a bookmark so that it can note cursor position when the user clicks the mouse, as this event is temporally related to the audio stream. Therefore, the application calls the Bookmark method exposed by the SpRecoContext object to set a bookmark within the current recognition stream. Because SR engine 206 in intermittently calling Site 428 with updates as to its position within the recognition steam, the SpRecoContext object 424 can determine when the SR engine 206 has reached the bookmark. When this happens, an event 500 is added to the event queue which is communicated back to application 202. This allows application 202 to coordinate its state with events coming back from SR engine 206.

This can be quite useful in speech recognition applications. For example, a user manipulation of the mouse can change the state of the application. However, prior to actually changing the state of the application, the application may wish to wait until SR engine 206 has reached the same temporal point in the recognition stream. This allows the application to synchronize with SR engine 206 exactly where the application desires to take action.

Figures 13, 14:
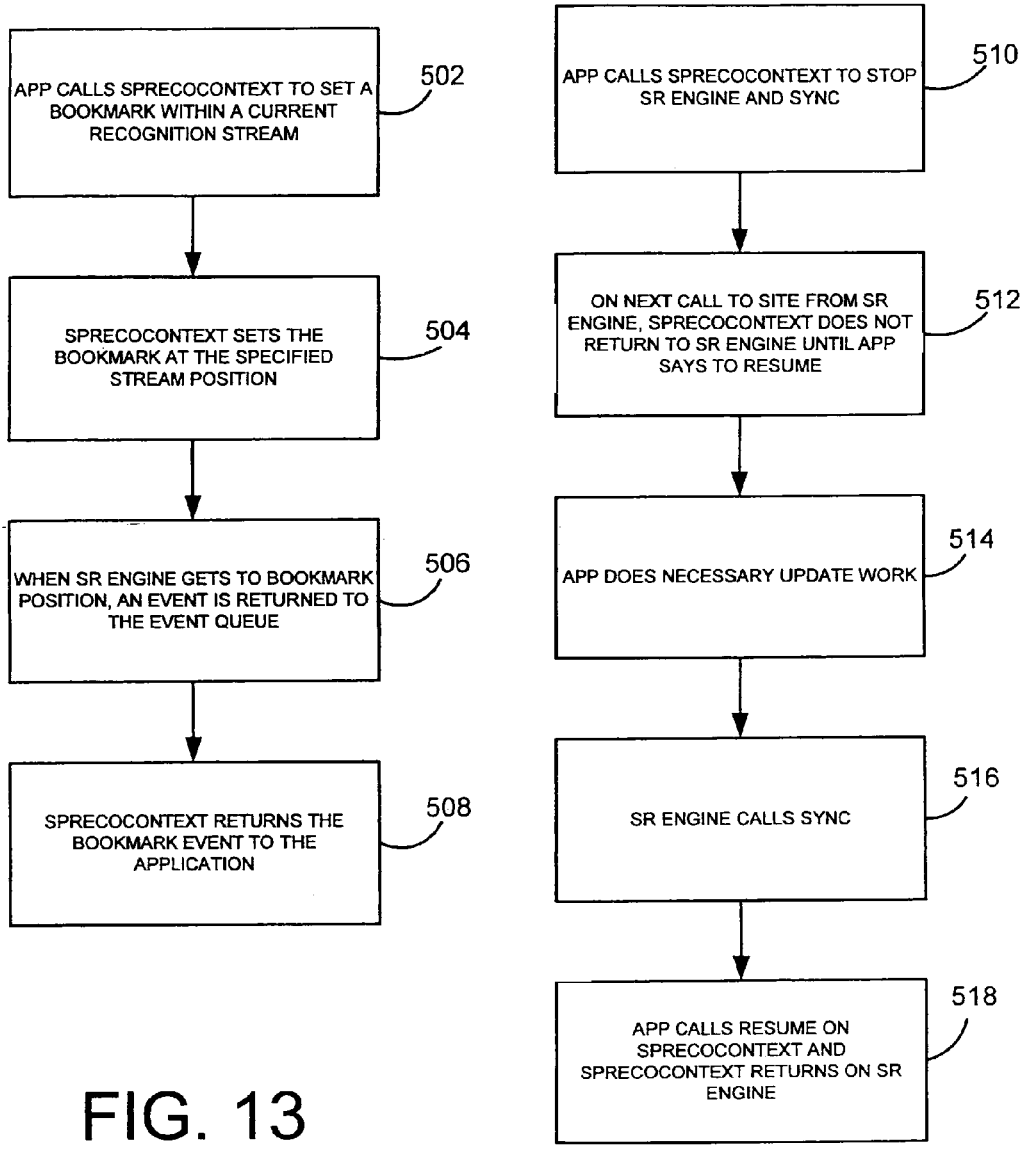
FIG. 13 is a flow diagram illustrating bookmarks.
FIGS. 14 and 15 are flow diagrams illustrating synchronization procedures.

FIG. 13 is a flow diagram better illustrating this process. First, the application 202 calls the SpRecoContext object 424 (illustratively the Bookmark method) to set a bookmark within the current recognition stream. This is indicated by block 502. The SpRecoContext object 424 sets the bookmark in the specified stream position as indicated by block 504. When the speech recognition engine 206 reaches the bookmark location, an event is returned to the event queue. This is indicated by block 506. The SpRecoContext object 424 then returns the bookmark event to application 202 as indicated by block 508.

Application 202 can also cause SR engine 206 to pause and synchronize with it in another way. FIG. 14 is a flow diagram which better illustrates this. Application program 202 calls a method (such as the Pause method) exposed by the SpRecoContext object 424 to stop SR engine 206 for synchronization. This is indicated by block 510. On the next call from the SR engine 206 to Site, the SpRecoContext object 424 does not return on that call to the SR engine 206 until the SR application 202 has said to resume recognition. This is indicated by block 512. At that time, the application can do necessary work in updating the state of the active grammar or loading another grammar to be used by SR engine 206 as indicated by block 514. During the pause mode, the SR engine 206 still calls the sync method exposed by Site 428, and asks it for updates to its active grammar as discussed above. This is indicated by block 516. After the synchronization has been completed, the SpRecoContext object 420 returns to the application 202 and the application calls Resume on SpRecoContext object 420. This is indicated by block 518. In response, SpRecoContext object 424 returns on the SR engine call so that the SR engine can continue processing.

Figure 15:
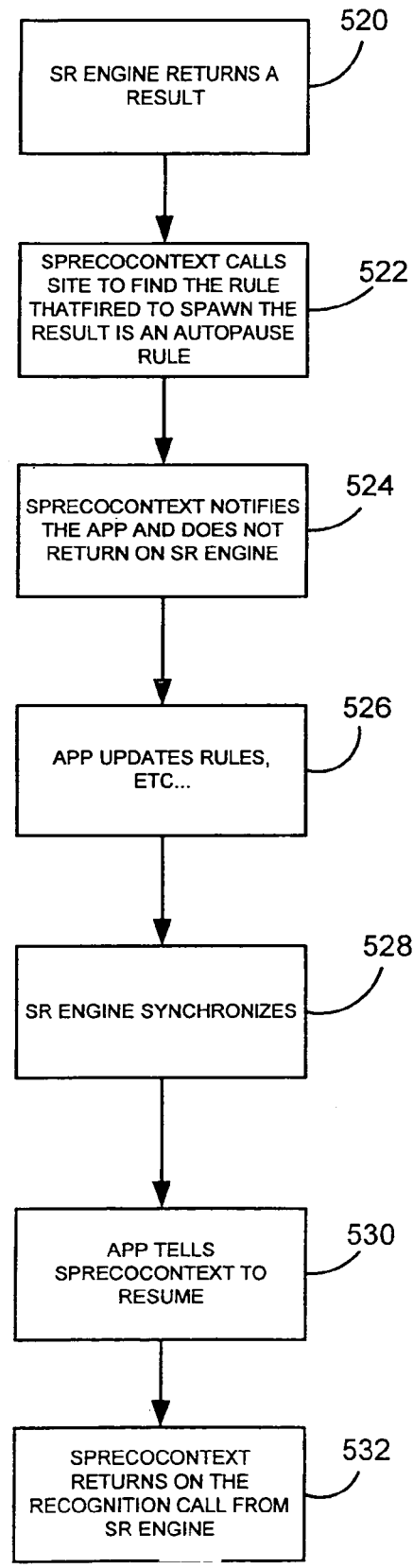

FIG. 15 is another flow diagram illustrating yet another way in which SR engine 206 can synchronize with application 202. Individual rules in the SpRecoGrammar object 426 can be tagged as autopause rules. When SR engine 206 recognizes one of these rules, the SR engine 206 is set into a pause state while the application 202 changes grammars. When the application is finished and calls resume, the SR engine now has the appropriate grammar to continue recognition.

Therefore, SR engine 206 first returns a result to Site 428. This is indicated by block 520. The SpRecoContext object 424 calls Site 428 to find that the rule which fired to spawn the recognition is an autopause rule. This is indicated by block 522. The SpRecoContext object 424 then notifies application 202 and does not return on the SR engine 206 at that time. This effectively pauses SR engine 206, and audio input is buffered in the meantime. This is indicated by block 524.

During this pause state, application 202 updates the grammar rules, words, transitions, etc., as desired. This is indicated by block 526. Because a recognition event is also a synchronize event, SR engine 206 still calls Site 428 while in the pause mode. This is indicated by block 528. Thus, the SR engine obtains the updated state of its active grammar.

The application 202 then calls Resume on SpRecoContext object 424, as indicated by block 530. The SpRecoContext object then returns on the recognition call from SR engine 206, allowing SR engine 206 to continue recognition. This is indicated by block 532.

Figure 16:
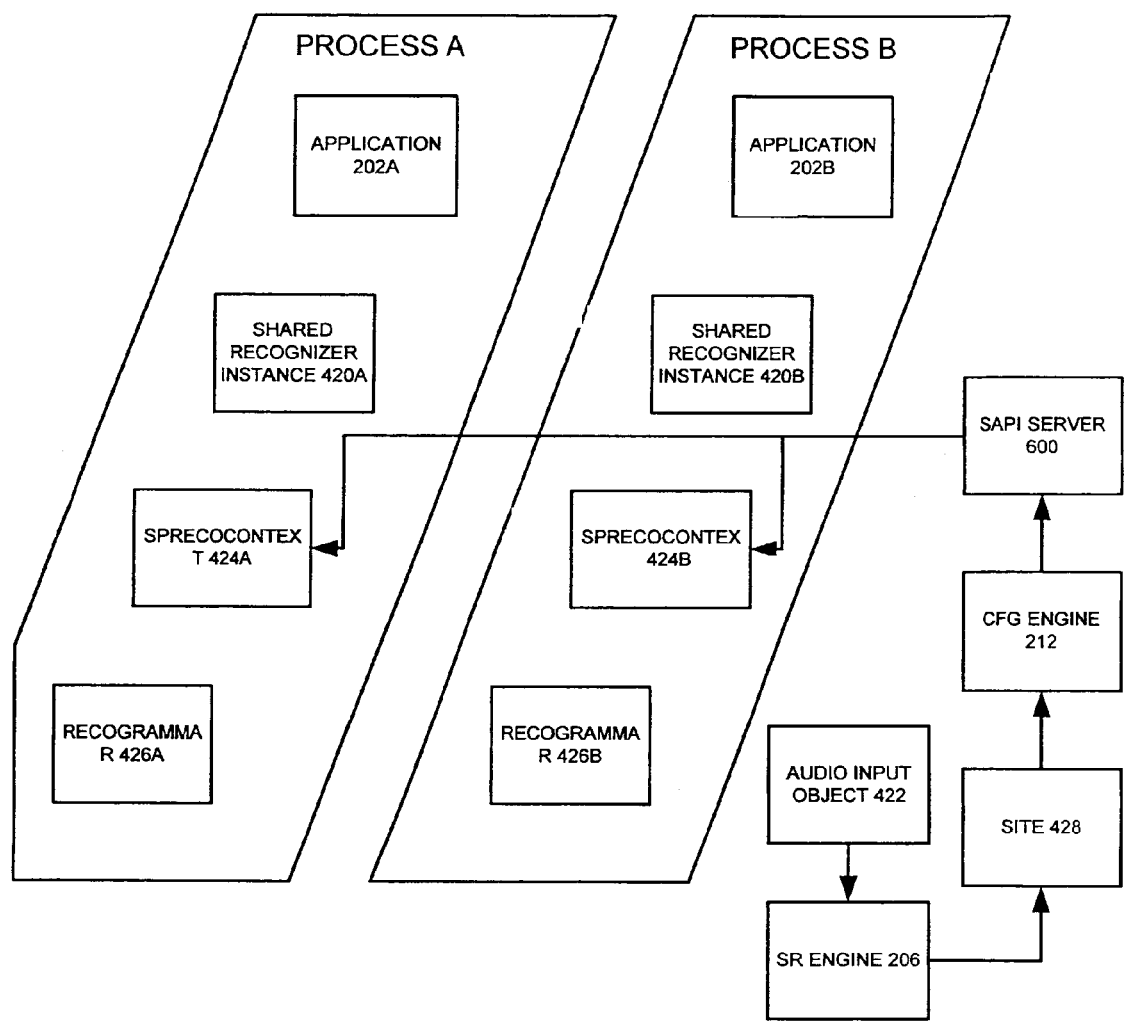
FIG. 16 is a more detailed block diagram of a multiprocess data marshaling implementation of the present invention.

FIG. 16 is a block diagram of a multiprocess implementation of the present invention. It may be desirable to have multiple applications implementing speech recognition technology at the same time. For example, it may well be desirable to use a command and control application which implements command and control steps based on speech commands. Similarly, it may be desirable to have another application, such as a word processing application, implementing speech recognition at the same time. However, it is also recognized that it may be desirable to have only a single arbiter determining what is actually said (i.e., it is desirable to have only a single speech recognition engine recognizing speech).

FIG. 16 indicates applications 202A and 202B. Many of the other contents in the block diagram are similar to those shown in FIG. 11, and are similarly number. However, the A and B suffixes indicate whether the objects are associated with process A or process B illustrated in FIG. 16. FIG. 16 also illustrates that the audio input object 422 and the SR engine 206 are part of the shared process so that only a single instance of each needs to be initiated. FIG. 16 further illustrates SAPI server 600 which can be implemented, as an executable program, for marshaling the delivery of recognized speech to the appropriate recognition process.

Figure 17:
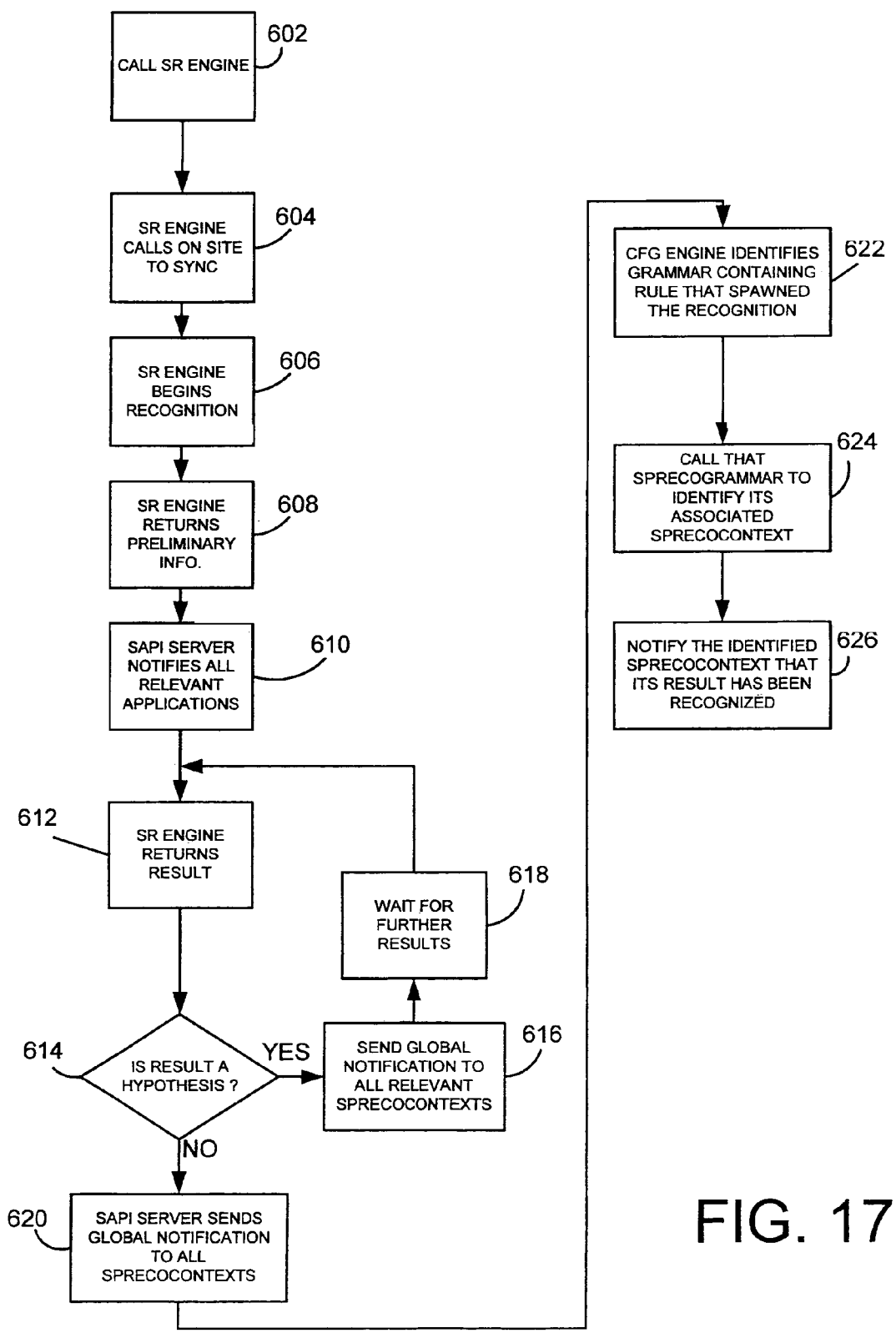
FIG. 17 is a flow diagram illustrating the data marshaling process.

FIG. 17 is a flow diagram illustrating data marshaling between processes. Both processes operate substantially as described with respect to FIG. 11, except both use audio input object 422 and SR engine 206. Therefore, one of the SpRecoContext objects first calls SR engine 206 on RecognizeStream. This is indicated by block 602 in FIG. 17. The SR engine then calls on Site 428 to synchronize and to obtain updates to its active grammar. This is indicated by block 604. The SR engine then begins its synchronization of the input data, as indicated by block 606.

SR engine 206 then returns preliminary information (such as its position within the recognition stream, when sound has been heard and has ended, and hypotheses). This is indicated by block 608. The SAPI server 600 notifies all applications 202A and 202B, which are currently operating, of the events returned by SR engine 206. SAPI server 600 illustratively does this through the RecoContext objects associated with the applications. This is indicated by block 610.

SR engine 206 then returns a result by calling the Recognition method exposed by Site 428. This is indicated by block 612. SAPI server 600 then determines whether it is a hypothesis (e.g., a preliminary result) by examining the hypothesis bit in the result returned by SR engine 206. This is indicated by block 614. If it is a hypothesis, then SAPI server 600 sends a global notification to all SpRecoContext objects that a hypothesis result has been received, and waits for a finally recognized result. This is indicated by block 616 and 618.

If, at block 614, it is determined that the result is final, then SAPI server 600 sends a global notification to all SpRecoContext objects indicating that a final result has been received. This is indicated by 620.

To better understand the remaining process, a brief discussion of CFG engine 212 may be helpful. The operation of CFG engine 212 is described in greater detail in copending U.S. patent application Ser. No. 09/751,613 which corresponds to U.S. Pat. No. 6,957,184. Briefly, for the sake of completeness, CFG engine 212 combines all grammars from all applications and RecoContext objects and combines them into a single set of grammars which is communicated to SR engine 206. Therefore, the single SR engine 206 only sees a large collection of words, rules, and transitions which it is to recognize. In maintaining the collection of grammars, CFG engine 212 maintains an indication as to where the grammars came from (i.e., which process they came from).

Recall that when SR engine 206 returns its results, it indicates the rule which fired to spawn the result. Therefore, by examining the rule identifier (or rule name) that fired to spawn the result, CFG engine 212 can identify the particular SpRecoGrammar object which the rule came from. The CFG engine 212 can then call methods exposed by that SpRecoGrammar object to obtain the SpRecoContext object associated with that grammar (such as by calling the GetRecoContext method). Identifying the grammar which the rule came from, and identifying the SpRecoContext object associated with that grammar is indicated by blocks 622 and 624, respectively.

This information is passed to SAPI server 600, which in turn notifies the SpRecoContext object associated with that grammar. The notification indicates that its result has been recognized. That SpRecoContext object can then notify its application and pass the recognition event on to the application, as indicated by block 626.

In conclusion, it can be seen that the middleware layer between the applications and engines provides many services for both the applications and engines, which had previously been performed by either the application or the engine. The present middleware layer does this in an application-independent and engine-independent manner.

Although the present invention has been described with reference to preferred embodiments, workers skilled in the art will recognize that changes may be made in form and detail without departing from the spirit and scope of the invention.

What is claimed is:

1. A multi-process speech recognition middleware layer of computer-readable instructions embedded on a computer-readable medium, the instructions being configured to, when executed, facilitate communication between a speech recognition (SR) engine and a plurality of speech recognition applications, the middleware layer comprising:
 a first process associated with a first speech recognition application including:
 a first context object having an application interface to enable application control of a first plurality of attributes of the speech recognition engine, the first context object also including an engine interface; and
 a first grammar object storing a first grammar used by the first process to support a speech recognition functionality associated with the first speech recognition application; and
 a second process associated with a second speech recognition application that is different than the first speech application, wherein the second process includes:
 a second context object having an application interface to enable application control of a first plurality of attributes of the speech recognition engine, the second context object also including an engine interface; and
 a second grammar object storing a second grammar used by the second process to support a speech recognition functionality associated with the second speech recognition application; and
 a server process configured to receive result information provided by the SR engine and provide the result information to the first or second process, to which the result information belongs.

2. The multi-process speech recognition middleware layer of claim 1 wherein the first and second grammars each include a plurality of rules and further comprising:
 a grammar engine configured to store a grammar indication indicating the grammar to which each of the plurality of rules belong.

3. The multi-process speech recognition middleware layer of claim 2 wherein the SR engine returns, along with the result information, a rule identifier identifying a rule which spawned the result information.

4. The multi-process speech recognition middleware layer of claim 3 wherein the grammar engine examines the rule identifier to determine a particular grammar to which the identified rule belongs.

5. The multi-process speech recognition middleware layer of claim 1 wherein the server process queries the first or second grammar object containing the particular grammar to receive an identity of an associated context object.

6. The multi-process speech recognition middleware layer of claim 5 wherein the server process notifies the associated context object that the result belongs to its associated process.

7. The multi-process speech recognition middleware layer of claim 1 wherein the SR engine returns preliminary information to the server process and wherein the server process is configured to notify the first and second context objects of the preliminary information.

8. A multi-voice speech synthesis middleware layer of computer-readable instructions embedded on a computer-readable medium, the instructions being configured to, when executed, facilitate communication between one or more applications and a plurality of text-to-speech (TTS) engines, the middleware layer comprising:
 at least a first voice object having an application interface configured to receive TTS engine attribute information from the application and to instantiate first and second TTS engines based on the TTS attribute information, to receive a speak request requesting at least one of the TTS engines to speak a message, and to receive priority information associated with each speak request indicative of a precedence each speak request is to take, and wherein the first voice object has an engine interface configured to call a specified one of the first and second TTS engines to synthesize input data.

9. The multi-voice speech synthesis middleware layer of claim 8 wherein the at least first voice object is configured to receive a normal priority associated with a message and to call the TTS engines so the message with normal priority is spoken in turn.

* * * * *